US010323992B2

(12) United States Patent
Jones et al.

(10) Patent No.: US 10,323,992 B2
(45) Date of Patent: Jun. 18, 2019

(54) FORCE MEASURING LOAD PIN HAVING AT LEAST ONE SENSOR AND A SLOT THAT DIVIDES THE LOAD PIN INTO UPPER AND LOWER PORTIONS (71) Applicant: tecsis GmbH, Offenbach (DE)

(72) Inventors: Mark Jones, Columbus, OH (US); Bruce Yohr, Gahanna, OH (US); Reinhold Ost, Offenbach (DE); Hasan Mustafa, Columbus, OH (US)

(73) Assignee: tecsis GmbH, Offenbach (DE)

( * ) Notice: Subject to any disclaimer, the term of this patent is extended or adjusted under 35 U.S.C. 154(b) by 75 days.

(21) Appl. No.: 15/276,211

(22) Filed: Sep. 26, 2016

(65) Prior Publication Data

US 2018/0087978 A1    Mar. 29, 2018

(51) Int. Cl.
*G01L 1/04* (2006.01)
*G01L 1/22* (2006.01)
G01L 1/12 (2006.01)
G01L 1/18 (2006.01)
G01L 1/24 (2006.01)

(52) U.S. Cl.
CPC .............. *G01L 1/04* (2013.01); *G01L 1/2243* (2013.01); *G01L 1/12* (2013.01); *G01L 1/18* (2013.01); *G01L 1/24* (2013.01)

(58) Field of Classification Search
CPC ..... G01L 1/04; G01L 1/26; G01L 1/22; G01L 1/20; G01B 7/18
USPC .......................................................... 73/781
See application file for complete search history.

(56) References Cited

U.S. PATENT DOCUMENTS

| 3,754,610 | A | | 8/1973 | Paelian et al. | |
|---|---|---|---|---|---|
| 3,992,934 | A | * | 11/1976 | Clark | B63B 21/00 73/862.631 |
| 4,165,637 | A | * | 8/1979 | Kooman | B63B 21/00 73/862.393 |
| 4,283,941 | A | | 8/1981 | Kutsay | |
| 4,364,280 | A | * | 12/1982 | Kutsay | G01L 1/26 73/862.382 |
| 5,419,210 | A | * | 5/1995 | Haker | G01G 3/1408 73/862.631 |
| 5,700,982 | A | * | 12/1997 | Neuman | G01G 3/1412 141/83 |
| 6,679,127 | B2 | * | 1/2004 | McKenna | G01G 3/1408 73/862.631 |
| 6,769,315 | B2 | * | 8/2004 | Stevenson | G01G 19/12 73/794 |
| 7,644,636 | B2 | * | 1/2010 | Gregory | G01L 1/2225 73/862.621 |

(Continued)

FOREIGN PATENT DOCUMENTS

DE    102012213698 A1 *  2/2014  ............. G01L 5/102

*Primary Examiner* — Jonathan M Dunlap
*Assistant Examiner* — Octavia Hollington
(74) *Attorney, Agent, or Firm* — Muncy, Geissler, Olds & Lowe, P.C.

(57) ABSTRACT

A load pin configured for measuring a force, the load pin including two sensors spaced apart from each other for measuring stress or tension. An axis includes a lateral surface configured to be subjected to a load from an upside in an area of the axis between the two sensors. A slot divides the axis into a lower portion and an upper portion, the slot extending essentially in an axial direction of the axis.

16 Claims, 7 Drawing Sheets (56) References Cited

U.S. PATENT DOCUMENTS

| | | | | |
|---|---|---|---|---|
| 7,793,551 B2* | 9/2010 | Shimazu | ............... | G01L 1/18 |
| | | | | 73/760 |
| 8,943,904 B2* | 2/2015 | McILravey | ............ | E02D 7/14 |
| | | | | 73/862.08 |
| 9,523,631 B2* | 12/2016 | Mizuochi | ............ | G01G 3/1408 |
| 9,874,485 B2* | 1/2018 | McCormick | ......... | G01L 5/0028 |

\* cited by examiner

FORCE MEASURING LOAD PIN HAVING AT LEAST ONE SENSOR AND A SLOT THAT DIVIDES THE LOAD PIN INTO UPPER AND LOWER PORTIONS

BACKGROUND OF THE INVENTION

Field of the Invention

The present invention relates to a load pin.

Description of the Background Art

Load pins may be used on cranes, mobile cranes, container spreaders, harbor cranes or other applications that use a pin, for example structural joints in bridges and buildings, hydraulic actuators, and aircraft landing gear.

U.S. Pat. Nos. 3,754,610 and 4,283,941 disclose devices configured for measuring a force.

SUMMARY OF THE INVENTION

It is an object of the present invention to provide an improved load pin configured for measuring a force.

According to an exemplary embodiment of the present invention, a load pin configured for measuring a force can comprise an axis with two sensors spaced apart from each other for measuring stress or tension. The axis includes a lateral surface configured to be subjected to load from an upside in an area of the axis between the two sensors. A slot divides the axis into a lower portion and an upper portion and the slot extends essentially in an axial direction of the axis. Because of the slot between the lower portion and the upper portion, the lower portion is less or nearly not bent under load. Therefore, shear force and less rotation are transmitted to the sensors. Consequentially, the load pin is not prone to large errors from small variations in load conditions resulting from differences in surface roughness, changes in position and differences in surface hardness. Thus, measurement results determined by the load pin are very exact.

In an exemplary embodiment, to minimize the bending of the lower portion under load, the upper portion may be larger than the lower portion.

In an exemplary embodiment, the upper portion comprises recesses arranged at least in an upper area of the lateral surface to concentrate stress or tension to the sensors. Therefore, an exactness of the measurement can be significantly increased.

In an exemplary embodiment, the axis comprises a center portion adapted to be subjected to load from another part.

In an exemplary embodiment, the center portion is raised from the lateral surface. This added raised center portion reduces an influence of a bending still occurring in the center portion as the case may be.

For example, the center portion may surround the lateral surface of the axis in the area configured to be subjected to load from an upside.

In an exemplary embodiment, the center portion is designed as a spherical segment. The spherical radius further reduces change in load conditions.

In a further embodiment, a length of the slot in an axial direction of the axis equals a length of a distance between the two sensors. Therefore, an exactness of the measurement of the sensors can be further increased.

For example, the slot can have two endings and comprises a semicircular shape on the endings. This semicircular shape results in a defined bending of the lower portion and therefore in a high accuracy of the measurement of the load pin.

For instance, the slot can extend through the axis from one side of the lateral surface to another side of the lateral surface or extends from one side of the lateral surface into the axis to a defined depth.

In an exemplary embodiment, a channel inside the axis is provided for connecting the sensors with a cable coming from one face side of the axis. This way, a very simple and safe connection of the sensors with an analysis unit can be achieved.

According to another aspect of the present invention a load pin configured for measuring a force comprises an axis with at least one sensor for measuring stress or tension. The axis includes a lateral surface configured to be subjected to load from an upside above the at least one sensor. A recess divides the axis into a lower portion and an upper portion and the recess extends essentially in an axial direction of the axis. Because of the recess between the lower portion and the upper portion the lower portion is less or nearly not bent under load. Therefore, shear force and less rotation are transmitted to the sensor. Consequentially, the load pin is not prone to large errors from small variations in load conditions resulting from differences in surface roughness, changes in position and differences in surface hardness. Thus, measurement results determined by the load pin are very exact.

For example, the recess is one of a sink from one side of a lateral surface into the axis, two sinks from two sides of the lateral surface into the axis, and a slot.

In an exemplary embodiment, the recess can be milled. Thus, very exact dimensions of the recess can be achieved. Consequentially a very exact configuration of the load pin for different applications can be achieved.

In an exemplary embodiment, the recess can have at least two endings and comprises a semicircular shape on the endings. This semicircular shape leads to a defined bending of the lower portion and therefore to a high accuracy of the measurement of the load pin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION

Figure 1:
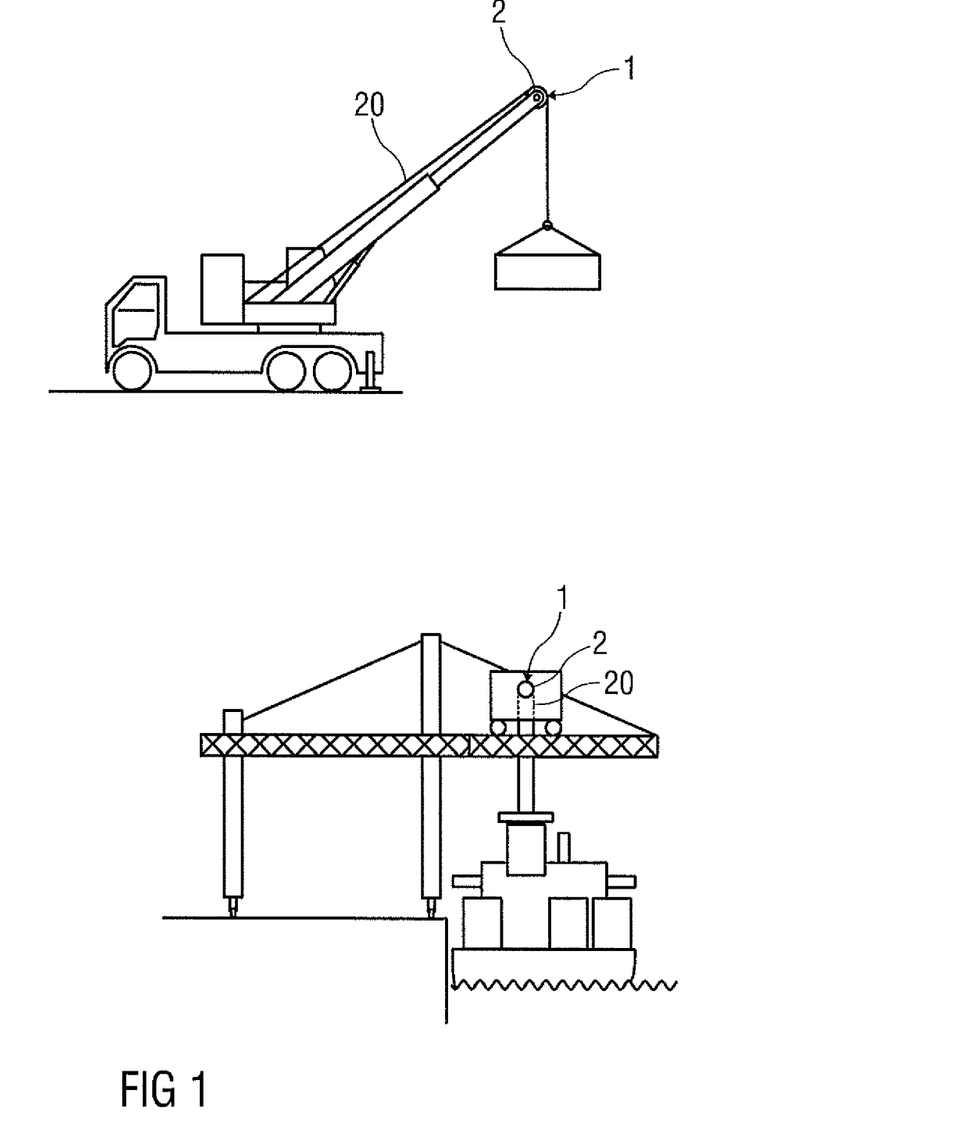
FIG. 1 is a schematic view of applications of a load pin.

FIG. 1 shows a schematic view of applications of a load pin 1. For example, the load pin 1 is used on cranes 50, mobile cranes 50, container spreaders, harbor cranes 50 or other applications that use a pin, for example structural joints in bridges and buildings, hydraulic actuators, and aircraft landing gears.

A load is measured via the load pin which is integrated in a crane construction. For example the load of a rope, chain, or cable 20 is transmitted via a wheel 2 to the load pin 1.

Any other applications are possible where a load of a rope, chain, or cable 20 or a construction should be monitored on an axis A of a load pin 1.

Figure 2A:
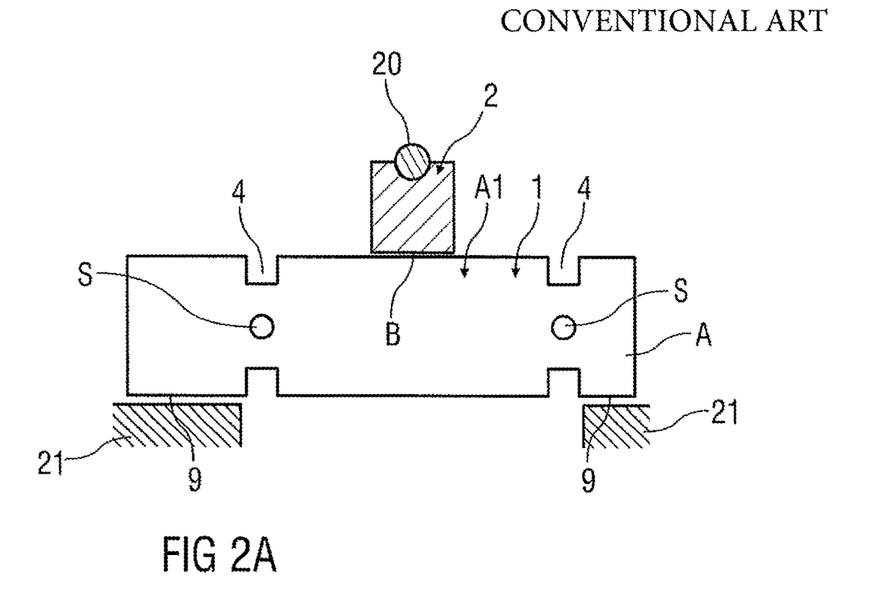
FIG. 2A is a schematic sectional view of an arrangement with a load pin according to the conventional art in an unloaded condition.

FIG. 2A shows a schematic sectional view of an arrangement with a load pin 1 according to the conventional the art in an unloaded condition.

The load pin 1 is configured for measuring a force and comprises an axis A with two sensors S spaced apart from each other for measuring stress or tension. The axis A includes a lateral surface A1 configured to be subjected to load from an upside in an area B of the axis A between the two sensors S. Further, the axis comprises two surrounding recesses 4 in an area of the sensors S to concentrate stress or tension to the sensors S.

On an underside the axis A is mounted with its endings 9 on two bearings 21.

Figure 2B:
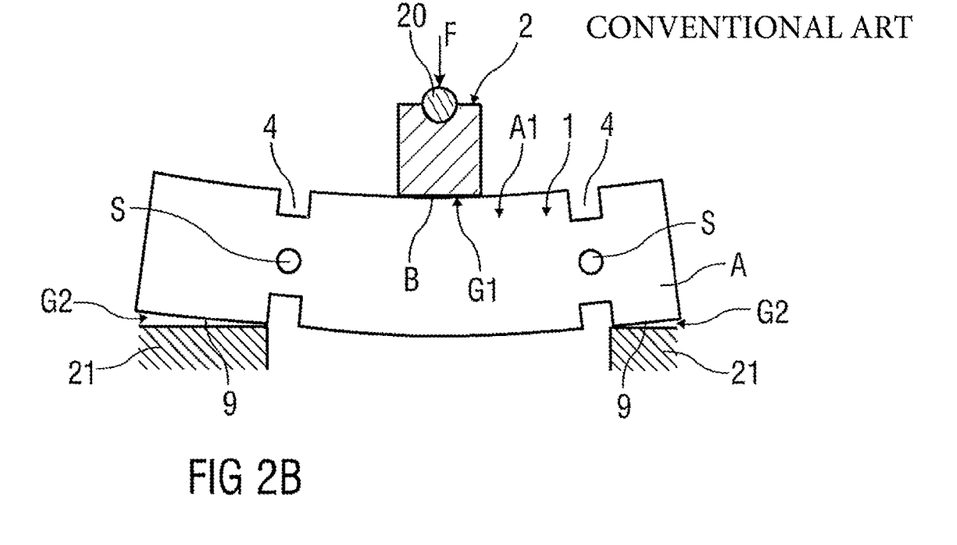
FIG. 2B is a schematic sectional view of the arrangement shown in FIG. 2A in a loaded condition.

FIG. 2B shows a schematic sectional view of the arrangement shown in FIG. 2A in a loaded condition, wherein in the loaded condition a force F acts on the wheel 2 and on the axis A.

Due to the force F, the axis is bent and the sensors S measure a shear force which is combined with rotation, which has bad influence on measured values.

Due to the bending a gap G1 between the wheel 2 and the axis A and further gaps G2 between the ends 9 and the bearings 21 are generated. These gaps G1, G2 also create errors. Bending, rotation and changes in load conditions, also created from the recesses 4, create errors and peaks in measured values at the sensors S. The load pin 1 is thus prone to large errors from small variations in load conditions such as differences in surface roughness, change in position and differences in surface hardness.

Figure 2C:
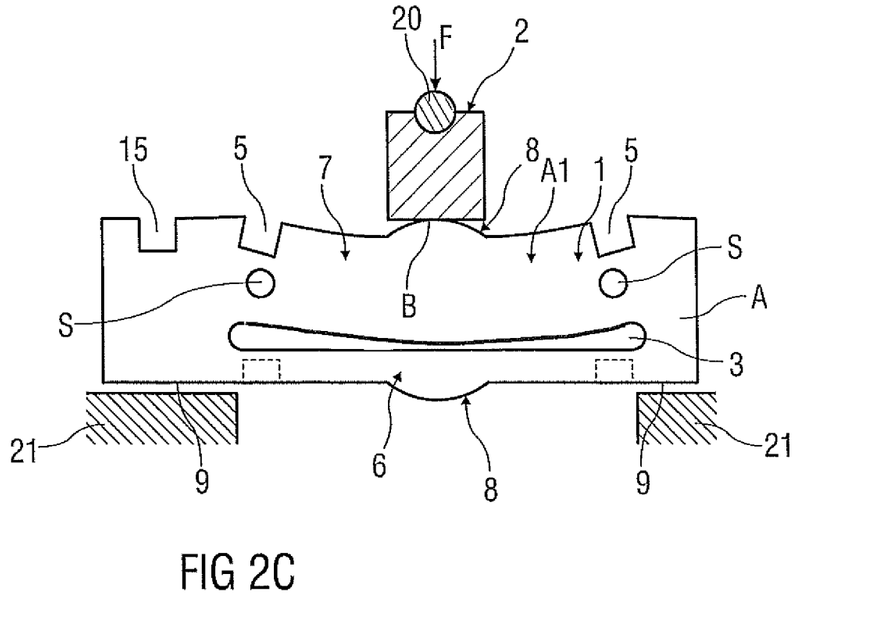
FIG. 2C is a schematic sectional view of an arrangement with a load pin in a loaded condition.

FIG. 2C shows a schematic sectional view of an arrangement with an exemplary embodiment of a load pin 1 according to an aspect of the invention in a loaded condition.

In contrast to the load pin 1 according to the conventional art shown in FIGS. 2A and 2B, the exemplary embodiment of the load pin 1 shown in FIG. 2C comprises the axis A with a slot 3, which divides the axis A into a lower portion 6 and an upper portion 7, wherein the slot 3 extends essentially in an axial direction of the axis A. Further the slot 3 extends through the axis A from one side of the lateral surface B to another side of the lateral surface B and has two endings and comprises a semicircular shape on the endings. In other exemplary embodiments, the slot 3 extends from one side of the lateral surface B into the axis A to a defined depth. In the shown embodiment, for example, the upper portion 7 is larger than the lower portion 6. Due to this separation of the axis A only the upper portion 7 is bent under load by the force F. The lower portion 6 is less or nearly not bent under load by the force F. Thus, shear force and less rotation is transmitted to the sensors S. Therefore, in the gaps G1, G2, errors or measuring peaks are not possible or at least reduced.

The force F is introduced from the rope wheel 2 via a center portion 8 to the axis A. The center portion 8 is raised from the lateral surface A1 of the axis A and surrounds the lateral surface A in the area B configured to be subjected to load from the upside. The center portion 8 is designed as a spherical segment. This added raised center portion reduces the influence of the bending still occurring in the center portion. The spherical radius to this surface further reduces change in load conditions.

Furthermore, the upper portion 7 of the axis comprises recesses 5 arranged in an upper area of the lateral surface B in an alignment with the sensors S to concentrate stress or tension to the sensors S.

Additionally, the axis A comprises a recess 15 for fixing the load pin 1 against turning in the application. Other anti-rotation mechanisms well known to those skilled in the art of load pin 1 design could also be used.

The center portion 8 and the ends 9 of the axis can be modified in many ways known to those skilled in the art of load cell design.

In exemplary embodiments the recesses 5, 15, undercuts, reliefs and other structures may only be milled in the upper portion of the load pin 1. Consequently, recesses at the bearings 21 are minimized. This allows fewer changes in changing loading conditions, so that the lower portion 6 is more rigid.

Figure 3A:
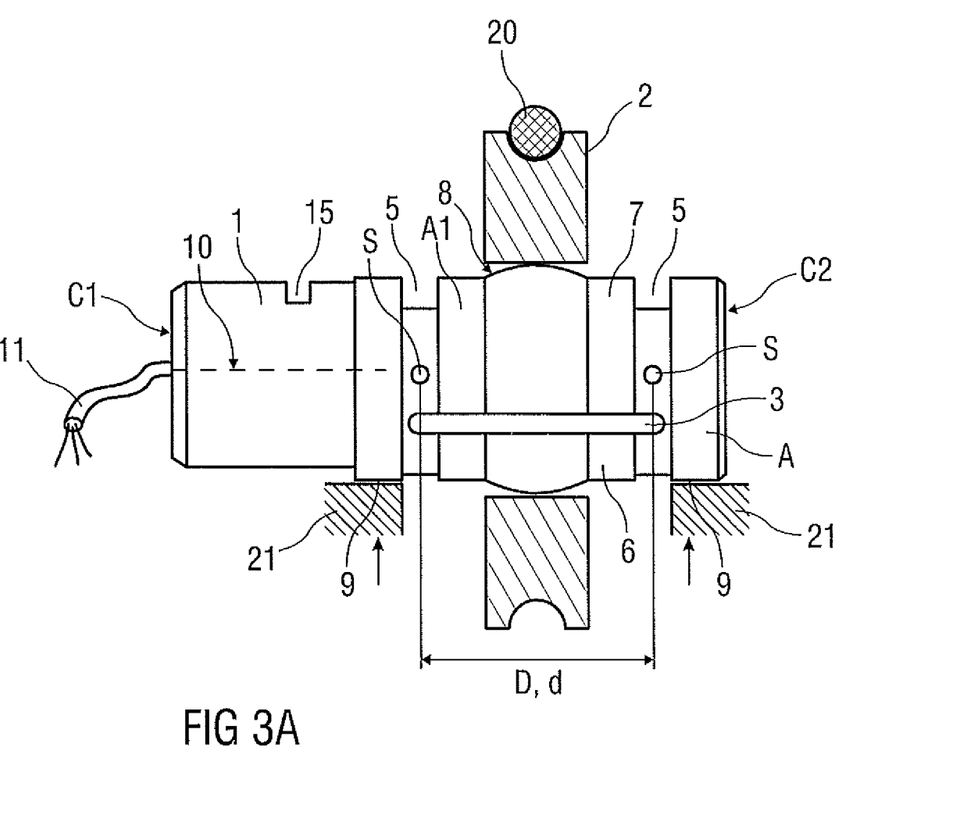
FIG. 3A is a schematic sectional view of an arrangement with a load pin in an unloaded condition.
Figure 3B:
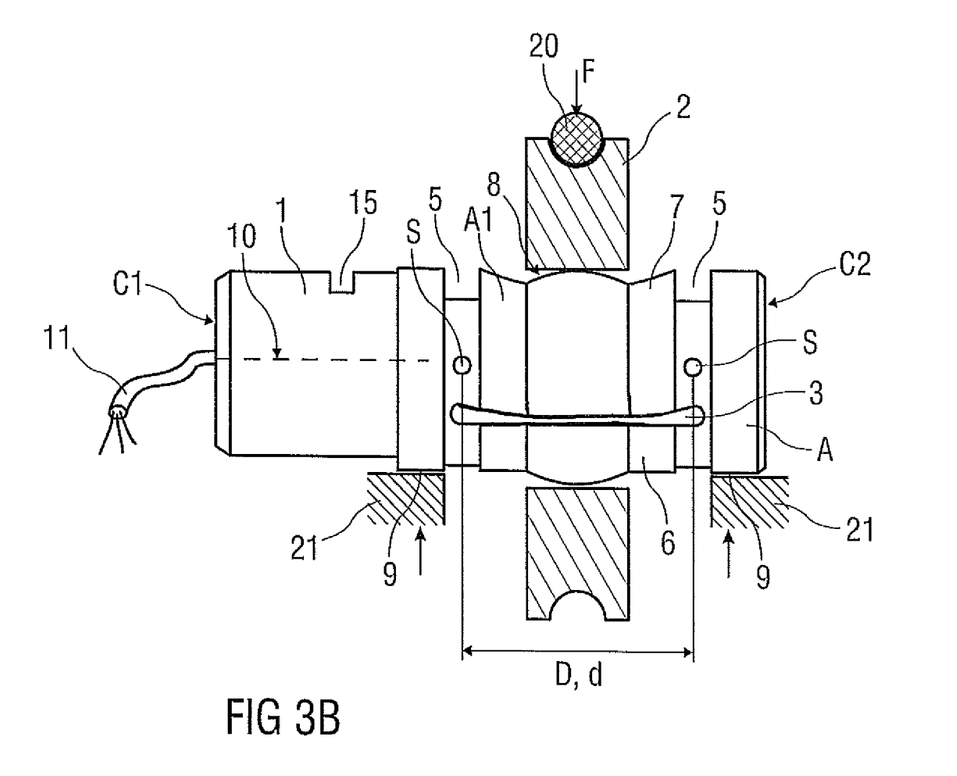
FIG. 3B is a schematic sectional view of the arrangement shown in FIG. 3A with a load pin in a loaded condition.
Figure 4A:
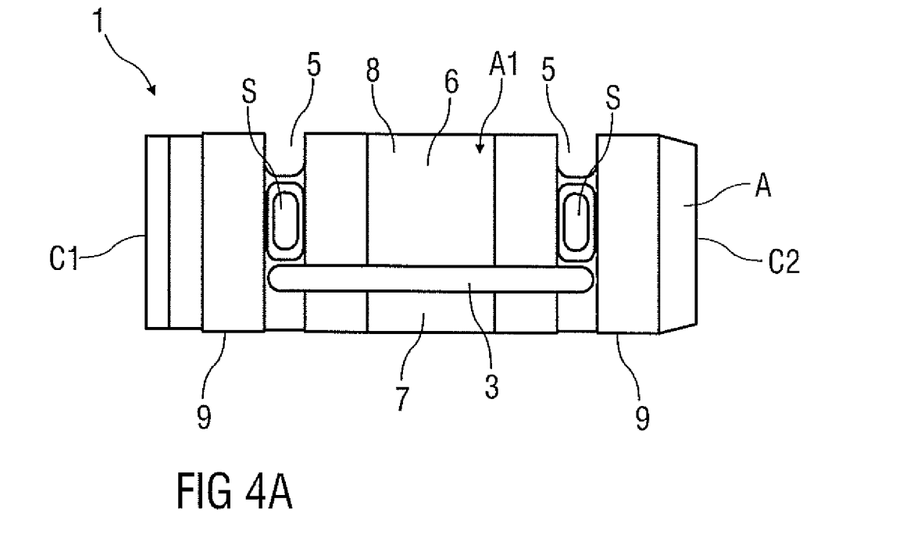
FIG. 4A is a schematic plan view on a lateral surface of a load pin.
Figure 4B:
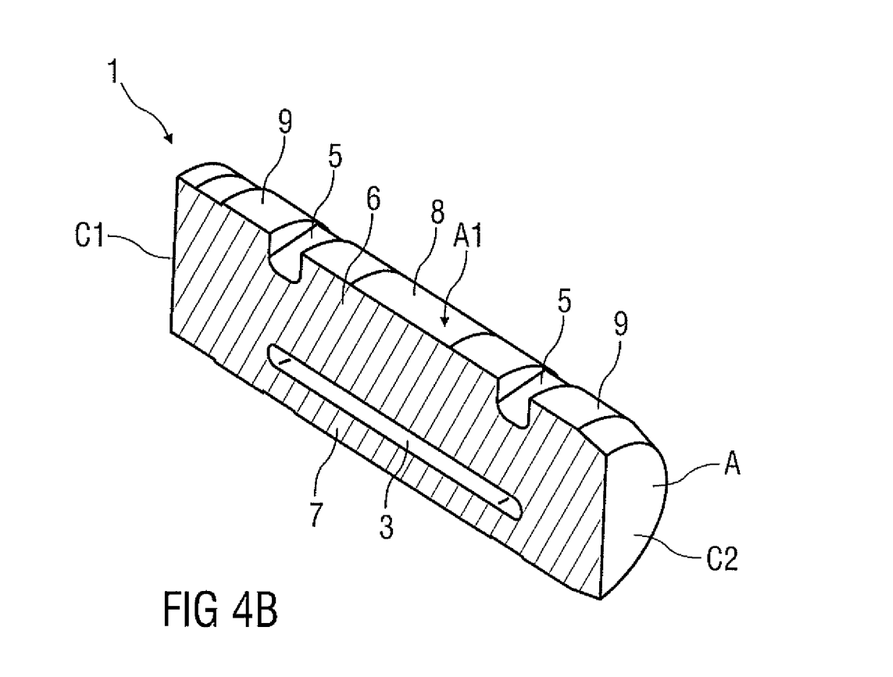
FIG. 4B is a schematic perspective view of a section of the load pin shown in FIG. 4A.
Figure 4C:
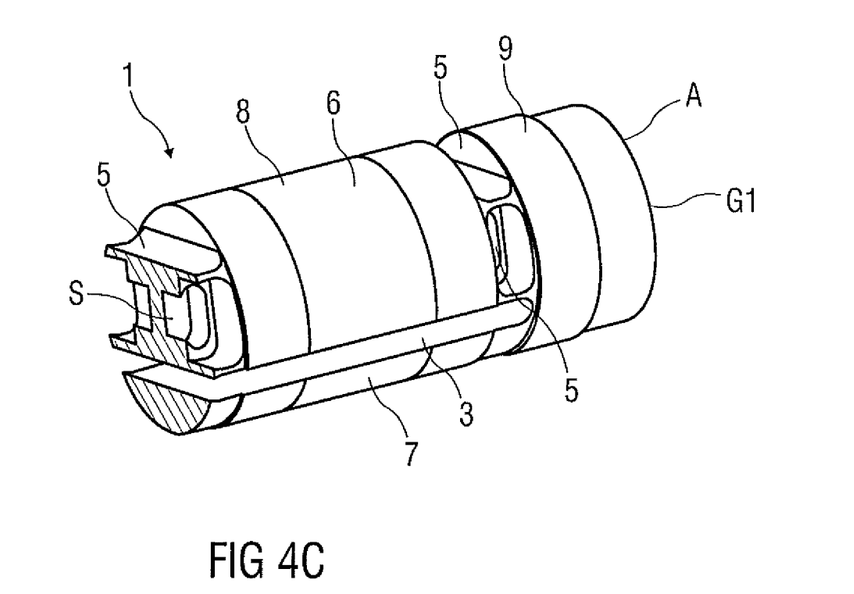
FIG. 4C is a schematic perspective view of a section of the load pin shown in FIG. 4A.
Figure 4D:
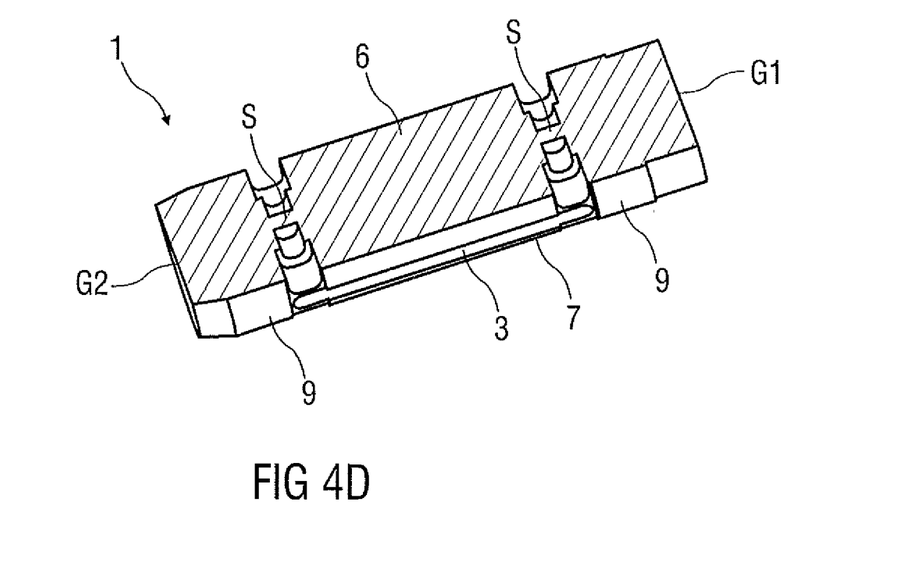
FIG. 4D is a schematic perspective view of a section of the load pin shown in FIG. 4A.

FIG. 3A shows a schematic sectional view of an arrangement with an exemplary embodiment of a load pin 1 according to an aspect of the invention in an unloaded condition. FIG. 3B shows this arrangement in a loaded condition.

In addition to the load pin 1 shown in FIG. 2C, the load pin 1 of FIG. 3A includes a channel 10 inside the axis A for connecting the sensors S with a cable 11 coming from one face side C1 of the axis A. The channel 10 is arranged on the lateral surface B or is integrated completely inside the axis A.

The rope, chain, or cable 20 introduces a load force F via the wheel 2 to the axis A of the load pin 1 over the raised center portion 8, which completely surrounds the axis A.

The slot 3 separates the axis A in the lower portion 6 and the upper portion 7, which has more deflection under load than the lower portion.

A length D of the slot 3 in an axial direction of the axis A between two face sides C1, C2 equals a distance d between the two sensors S or the distance d between the two sensors S is longer or shorter in a region of about 5 mm-10 mm. The diameter of the axis A of the load pin 1 could be as small as 7 mm. There is no inherent limit on the maximum size.

In an exemplary embodiment, the sensors S are constructed as conventional bonded foil strain gauges. Each sensor S contains one or more strain gauges. Other types of strain/stress gauges could also be incorporated such as silicon or thin film technology. Other known methods of force measuring based on principles such as fiber optics, magneto-elastic effects or piezo-resistivity can also be used.

In other exemplary embodiments there is only one sensor S to measure the force F.

In other exemplary embodiments, a recess (not shown) divides the axis A into a lower portion 6 and an upper portion 7, wherein the recess extends essentially in the axial direction of the axis A. The recess is one of a sink from one side of the lateral surface B into the axis S and two sinks from two sides of the lateral surface B into the axis A. The recess can be milled. In one embodiment, the recess has at least two endings and comprises a semicircular shape on the endings.

FIG. 4A to 4D show different views of an exemplary embodiment of a load pin 1 according to an aspect of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A load pin configured for measuring a force, the load pin comprising:
   two sensors spaced apart from each other for measuring stress or tension,
   an axis including a lateral surface configured to be subjected to a load from above in an area of the axis between the two sensors; and
   a slot dividing the axis into a lower portion and an upper portion, the slot extending essentially in an axial direction of the axis,
   wherein the axis comprises a center portion adapted to be subjected to the load,
   wherein the center portion is a spherical segment, and
   wherein the upper portion is larger than the lower portion.

2. The load pin according to claim 1, wherein the upper portion comprises recesses arranged at least in an upper area of the lateral surface to concentrate stress or tension to the sensors.

3. The load pin according to claim 2, wherein a first one of the two sensors is located in the axis in a position that aligns with a first end of the slot and a second one of the two sensors is located in the axis in a position that aligns with a second end of the slot, and wherein a first one of the recesses arranged at least in the upper area of the lateral surface is aligned with the first one of the two sensors and the first end of the slot and a second one of the recesses arranged at least in the upper area of the lateral surface is aligned with the second one of the two sensors and the second end of the slot.

4. The load pin according to claim 1, wherein the center portion is raised from the lateral surface.

5. The load pin according to claim 1, wherein the center portion surrounds the lateral surface of the axis in the area configured to be subjected to the load.

6. The load pin according to claim 1, wherein a length of the slot in an axial direction of the axis substantially equals a length of a distance between the two sensors.

7. The load pin according to claim 1, wherein the slot has two endings and comprises a semicircular shape on the endings.

8. The load pin according to claim 1, wherein the slot extends through the axis from one side of the lateral surface to another side of the lateral surface or extends from one side of the lateral surface into the axis to a defined depth.

9. The load pin according to claim 1, wherein a channel is provided inside the axis for connecting the sensors with a cable coming from one face side of the axis.

10. The load pin according to claim 1, wherein the center portion surrounds the axis.

11. A load pin configured for measuring a force, the load pin comprising:
    two sensors spaced apart from each other for measuring stress or tension,
    an axis including a lateral surface configured to be subjected to a load from above in an area of the axis between the two sensors; and
    a slot dividing the axis into a lower portion and an upper portion, the slot extending essentially in an axial direction of the axis,
    wherein the upper portion is larger than the lower portion.

12. A load pin configured for measuring a force, the load pin comprising:
    an axis with at least one sensor for measuring stress or tension, the axis including a lateral surface configured to be subjected to a load from an area above the at least one sensor; and
    a recess dividing the axis into a lower portion and an upper portion, the recess extending essentially in an axial direction of the axis,
    wherein the axis comprises a center portion adapted to be subjected to the load,
    wherein the center portion is a spherical segment, and
    wherein the upper portion is larger than the lower portion.

13. The load pin according to claim 12, wherein the recess is a sink from one side of a lateral surface into the axis; two sinks from two sides of the lateral surface into the axis; or a slot.

14. The load pin according to claim 12, wherein the recess is milled.

15. The load pin according to claim 12, wherein the recess has at least two endings and comprises a semicircular shape on the endings.

16. The load pin according to claim 12, wherein the center portion surrounds the axis.

* * * * *